(12) United States Patent
Blomquist et al.

(10) Patent No.: US 6,496,637 B2
(45) Date of Patent: Dec. 17, 2002

(54) LOW OPTICAL LOSS POLYMERS

(75) Inventors: Robert Blomquist, Whippany, NJ (US); Jian Ming S. Deng, Brooklyn, NY (US); Lawrence W. Shacklette, Maplewood, NJ (US); MacRae Maxfield, Teaneck, NJ (US)

(73) Assignee: Corning Incorporated, Corning, NY (US)

( * ) Notice: Subject to any disclaimer, the term of this patent is extended or adjusted under 35 U.S.C. 154(b) by 36 days.

(21) Appl. No.: 09/747,068

(22) Filed: Dec. 21, 2000

(65) Prior Publication Data

US 2002/0122647 A1 Sep. 5, 2002

(51) Int. Cl.[7] .................................................. G02B 6/10
(52) U.S. Cl. ..................... 385/129; 385/130; 385/131; 385/141
(58) Field of Search ................................. 385/129, 130, 385/131, 132, 14, 141, 142, 143, 144

(56) References Cited

U.S. PATENT DOCUMENTS

5,861,976 A   1/1999   Hoekstra ..................... 359/288

*Primary Examiner*—Brian Healy
(74) *Attorney, Agent, or Firm*—Price, Heneveld, Cooper, Dewitt & Litton (57) ABSTRACT

A fluorinated polymerizable compound useful for fabricating planar optical devices includes at least one fluorinated alkylene or alkylene ether moiety and at least two terminal acrylate moieties, each terminal acrylate moiety being connected to one of the fluorinated alkylene or fluorinated alklene ether moieties by an ester linking group. The fluorinated polymerizable compounds, or macromers, of this invention are useful for forming optical components exhibiting a refractive index comparable to that of glass fiber waveguides, while also exhibiting very low absorption losses. Polymerizable compositions suitable for preparing optical components can be prepared by combining the macromers of the invention with a photoinitiator. Conventional optical monomers may also be employed, if desired.

11 Claims, 1 Drawing Sheet

Fig. 1

LOW OPTICAL LOSS POLYMERS

BACKGROUND OF THE INVENTION

1. Field of the Invention

The present invention relates to fluorinated compounds that may be polymerized to form materials exhibiting low light loss, and to planar waveguide devices fabricated from polymerizable fluorinated compounds.

2. Technical Background

It is known to fabricate planar waveguide devices such as optical switches, variable attenuators, and tunable gratings of polymeric materials. Polymeric waveguide devices generally comprise a lower cladding layer having a low refractive index, a core layer having a high refractive index and an upper cladding layer having a low refractive index.

A typical method of fabricating waveguide components of polymeric materials involves depositing a liquid polymerizable composition onto the surface of a substrate, such as by spin-coating, and subsequently polymerizing the deposited coating. Fluorinated acrylate liquid monomers have the advantages of being solvent-free and provide low loss waveguide structures with very low birefringence. Conventional polymerizable coating compositions of this type, however, generally have several disadvantages. A significant disadvantage with typical compositions is that the polymerized material usually has a refractive index that is substantially lower than silica. This results in a mismatch between the refractive index of the polymer waveguide of the planar optical device and the silica waveguide of an optical fiber connected to the polymer waveguide. This mismatch of the refractive indexes increases coupling losses at the interface between the waveguides, and can also lead to unwanted reflection of a guiding optical signal at the interfaces of waveguide and fiber. The relatively low refractive index of typical polymers used in planar optical components is caused by the use of fluorinated monomers. The fluorinated monomers can be used to reduce the volume density of carbon-hydrogen bonds in polymeric optical materials and thereby reduce absorption losses associated with the vibration modes of these carbon-hydrogen bonds. Thus, although coupling losses between silica optical fibers and polymer waveguides can be reduced by lowering the concentration of fluorinated monomers, this would cause an undesirable increase in absorption losses. Therefore, it would be desirable to provide polymeric coating compositions that can be polymerized to form optical components having a refractive index more closely matched to the refractive index of silica, without increasing absorption losses.

Another disadvantage with conventional coating compositions used to form polymeric optical components is that the viscosity of such compositions is undesirably low, typically less than 100 centipoise. This low viscosity imposes constraints on the thickness of a single layer that can be applied by spin-coating. In addition, very low viscosity materials will sometimes flow along and/or from the surface of a substrate or previously spin-coated layer resulting in uneven coating thickness. This is undesirable because planar waveguides comprised of layers having a non-uniform thickness exhibit increased loss of light and other undesirable optical behavior. Therefore, polymerizable compositions having a relatively higher viscosity would be desirable for fabrication of planar waveguide devices.

Another problem with conventional polymerizable compositions used to fabricate planar waveguide devices is that the lower molecular weight monomers typically used in such compositions exhibit significant volatility, especially when the composition is exposed to a high vacuum. Typical polymerizable compositions used for fabricating planar waveguide devices include a monomer blend in which the various monomer components in the blend have different relative volatilities. As a result, the concentration of the various monomer components can change during processing steps, such as spin coating and polymerization. Because relatively thin layers (e.g., typically from about 2 microns to about 10 microns) are deposited during fabrication of a planar waveguide device, the compositional changes caused by the different relative volatilities of the monomer components can be relatively severe, profoundly degrading the ability to control the refractive index of the polymerized material. It is often desirable to polymerize the coating compositions under a vacuum or under a nitrogen blanket to eliminate the presence of oxygen during polymerization. In such cases, even a relatively low volatility makes it especially difficult to control the processes necessary to ensure that the coating has the composition required to achieve a desired refractive index. Volatile monomers also adversely affect the ability to use proximity printing processes (photolithographic processes in which a mask is spaced from the substrate during the radiation exposure step), since the volatile monomers can fog the mask during the printing process.

Accordingly, it would be highly desirable to provide polymerizable compositions for fabricating planar waveguide devices that exhibit a more favorable range of viscosities, with a lower volatility, and which can be polymerized to form a waveguide material that exhibits low light absorption losses and which has a refractive index that is closer to the refractive index of a silica optical fiber. More specifically, it would be desirable to provide fluorinated polymerizable compounds that exhibit a selected range of viscosities, low volatility, and that can be polymerized to form a material having a refractive index that more closely matches the refractive index of optical fibers.

SUMMARY OF THE INVENTION

The invention provides fluorinated compounds that overcome problems associated with conventional compositions used for fabricating polymeric waveguides. More specifically, the invention provides fluorinated compounds that may be polymerized to form materials exhibiting a higher refractive index that is more closely matched to that of a silica waveguide, while also achieving low absorption losses. The fluorinated compounds may also be used in coating compositions that have higher viscosities that are favorable for fabricating relatively thick layers of uniform thickness. The fluorinated compounds of this invention may also be used for preparing coating compositions having a relatively low volatility, whereby the fabrication of devices having a desired refractive index is more easily controllable, and which facilitates proximity printing.

In accordance with an aspect of the invention, the fluorinated compound comprises at least one fluorinated alkylene or alkylene ether moiety, and at least two terminal acrylate moieties. Each of the terminal acrylate moieties is connected to the fluorinated alkylene or fluorinated ether moiety or moieties by an ester (—$CO_2$—) linking group.

The invention also pertains to polymerizable compositions containing the fluorinated compounds, and to planar waveguide devices fabricated from such compositions.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawing is included to provide a further understanding of the invention and is incorporated and constitutes part of this specification. The drawing illustrates various features and embodiments of the invention, which, together with their description serve to explain the principals and operation of the invention.

DETAILED DESCRIPTION OF THE PREFERRED EMBODIMENT

The fluorinated compounds of this invention are multi-functional macromolecules that may be prepared by esterification reactions of polyfunctional organic acids, such as dicarboxylic acids, with polyols, such as diols. The esterification product may comprise generally any number of polyols and polycarboxylic acids. For example, a species which is the reaction product of a diol and two dicarboxylic acids can be prepared in high yields under appropriate conditions (e.g. reactant concentrations, temperature, etc.). Alternatively, appropriate techniques may be employed to form oligomeric chains of generally any desired length comprising alternating diols and diacid units. Further, trifunctional, tetrafunctional and other multifunctional polyols and polycarboxylic acids may be employed to provide branched structures. These esterification products may be terminated with either a hydroxyl group or a carboxylic acid group. The hydroxyl terminated reaction products may be reacted with a carboxyl functional acrylate. Suitable carboxyl functional acrylates include acrylic acid, methacrylic acid, acrylic acid esters containing a carboxylic acid group (—COOH), methacrylic acid esters containing a carboxylic acid group, as well as the corresponding acid chlorides (compounds having a —COCl group). Polyol-polycarboxylic acid reaction products having carboxlic acid terminals may be reacted with hydroxy functional acrylates, such a hydroxy ethyl acrylate (HEA).

Examples of suitable polycarboxylic acids include chlorendic diacid, isophthalic acid, tetrachlorophthalic acid, tetrabromophthalic acid, pyromellitic acid, various perfluoroalkyl acids such as those having the general formula $HO_2C(CF_2)_nCO_2H$, benzene tricarboxylic acid and various alkyl dicarboxylic acids having the general formula $(CH_2)_n(CO_2H)_2$ (including succinic acid, glutaric acid, adipic acid, maleic acid and fumaric acid), phthalic acid, terephthalic acid, tetrafluorophthalic acid, benzene tetracarboxylic acid, ethane tricarboxylic acid, propane tricarboxylic acid, butane tetracarboxylic acid and cyclohexanehexacarboxylic acid. The corresponding acid chlorides may be used rather than the acids. For example, the desired product can be obtained by reacting polyfunctional acid chlorides, (e.g., isophthaloyl dichloride) with a suitable polyol.

Examples of suitable polyols include octafluorohexanediol, dodecafluorooctanediol, hexadecafluorodecanediol, as well as various fluorinated diols available from Ausimont S.P.A. under the name FLUOROLINK®. FLUOROLINK® D and FLUOROLINK® D1000 have the general structure: $OCH_2CF_2O(CF_2CF_2O)_m(CF_2O)_nCF_2CH_2OH$. FLUOROLINK® D has a molecular weight of about 2000, and FLUOROLINK® D1000 has a molecular weight of about 1000. Other examples of suitable polyols include fluorinated diols with the following structure: $HOCH_2(CF_2OCF_2)_xCH_2OH$, where x is an integer. Specific examples include fluorinated triethylene glycol (x=2) and fluorinated tetraethylene glycol (x=3). Fluorinated diols of this type are commercially available from Exfluor Research Corp.

Examples of acrylates that may be reacted with hydroxyl terminated esters to form polymerizable fluorinated compounds in accordance with this invention include acrylic acid and methacrylic acid, as well as the corresponding acid chlorides (e.g., acryloyl chloride). An example of a suitable acrylate that may be reacted with a carboxylic acid or carboxylic acid chloride terminal group to form polymerizable fluorinated compounds in accordance with the invention include hydroxyethyl acrylate.

Other polymerizable fluorinated compounds encompassed, by this invention include acrylate derivatives of carbonates. Examples of compounds of this type can be prepared by reacting a polyol with a compound having a plurality of chloroformate (—OCOCl) groups. The reactants are connected through a carbonate (—$OCO_2$—) linkage to form a carbonate product. The product may have hydroxyl terminals or chloroformate terminals, and may be either linear or branched. The resulting carbonate product is reacted with an acrylate to form an acrylate derivative of a carbonate. Examples of suitable chloroformate compounds include hexafluorobisphenol A bischloroformate, tetrabromohexafluorobisphenol A bischloroformate, and propane bischloroformate. Examples of suitable polyols include those listed above. Other suitable polyols include hexafluorobisphenol A.

Examples of acrylates that can be reacted with hydroxyl-terminated carbonates include carboxylic acid functional acrylates such as acrylic acid, methacrylic acid, as well as the corresponding acid chlorides. Examples of acrylates that can be reacted with the chloroformate terminated carbonates include hydroxyl functional acrylates such as hydroxyethylacrylate and dihydroxypropylmethacrylate.

The polymerizable fluorinated polyester acrylates made with fluorinated polyols may be represented by the general formula:

where $B_d$ is a moiety represented by the formula: $R-(CO_2-)_2$, $B_1$ and each $B_2$ are moieties independently represented by the general formula: $R-(CO_2-)_i$, where i is an integer from 2 to 6, each R is independently an aromatic or aliphatic moiety that is optionally halogenated, n, m and L are integers, at least one of L and m is greater than zero, g and h are integers from 0 to 10, A is represented by the formula $CY_2=C(X)-CO_2-$, where Y is H or D, X is H, D, F, Cl or $CH_3$, W is represented by one of the formulae:

where r is an integer greater than or equal to 2, each $R_f$ is independently represented by the formulae: $-CH_2(CF_2)_tCH_2-$, $-CH_2CF_2O-[(CF_2CF_2O)_p-(CF_2O)_q]-CF_2CH_2-$, $-CH_2CH_2OCH_2CF_2O-[(CF_2CF_2O)_p-(CF_2O)_q]-CF_2CH_2OCH_2CH_2-$, or $-CH_2CF(CF_3)O(CF_2)_4O[CF(CF_3)CF_2O]_pCF(CF_3)CH_2-$, where k, p, q, and t are integers and q can optionally equal zero.

Examples of $B_d$, $B_1$ and $B_2$ may be selected from the polycarboxylic acids and corresponding acid chlorides described above. The $R_f$ groups are derived from the corresponding fluorinated diols. Examples of suitable fluorinated polyols that may be used include those described above.

Polymerizable fluorinated polyester acrylates prepared from fluorinated diacids may be represented by the general formula:

$$(A)_r-D_1-(R_f-((D_d-R_f)_gD_2-(A)_u)_t$$

where each $D_d$ is independently a moiety with the general structure $R-(CH_2O-)_2$, where each R is independently an aliphatic or aromatic moiety that is optionally halogenated, $D_1$ and each $D_2$ are independently moieties with the general structure $R'-(CH_2O-)_i$, where each R' is independently an aliphatic or aromatic moiety that is optionally halogenated, i is an integer from 2 to 6, A is represented by the formula $CY_2=C(X)-C(O)-$, where Y is H or D, X is H, D, F, Cl or $CH_3$, each $R_f$ is independently represented by one of the formulae: $-(O)C-(CF_2)_n-C(O)-$, $-(O)C-CF_2O-[(CF_2CF_2O)_p-(CF_2O)_q]-CF_2-C(O)-$ or $-(O)C-CF(CF_3)O(CF_2)_4O[CF(CF_3)CF_2O]_pCF(CF_3)-C(O)-$, where g, n, p, q, r, u and t are integers, with at least one of r and t being a positive integer and q can optionally equal zero. Examples of $D_d$, $D_1$ and $D_2$ may be derived from ethylene glycol, propylene glycol, butanediol, pentanediol, hexanediol, heptanediol, octanediol, catechol, hydroquinone and tetrafluorohydroquinone. Examples of $D_1$ and $D_2$ include glycerine, butanetriol, sucrose, pentaerythritol, pyrogallol and phloroglucinol. The $R_f$ groups are derived from polycarboxylic acids or the corresponding acid chlorides. Examples include tetrafluorosuccinic acid, hexafluoroglutaric acid, octafluoroadipic acid, dodecafluorosuberic acid, tetradecafluoroazelaic acid, and FLUOROLINK® C (available from Ausimont). FLUOROLINK® C has the structure:

$$HO_2C-CF_2O-[(CF_2CF_2O)_p-(CF_2O)_q]-CF_2-CO_2H$$

Other examples are fluorinated diacids or the corresponding acid chlorides with the following structure: $HO_2C(CF_2OCF_2)_xCO_2H$, where x is an integer. Specific examples include Perfluoro-3,6-dioxaoctane-1,8-dioic acid (x=2) and Perfluoro-3,6,9-trioxaundecane-1,11-dioic acid (x=3). Fluorinated diacids of this type are commercially available from Exfluor Research Corp.

The acrylate derivatives of carbonates made with fluorinated diols may be represented by the general formula:

Each $E_d$ is independently a moiety with the general structure $R-(OCO_2-)_2$, where each R is independently an aliphatic or aromatic moiety that is optionally halogenated, $E_1$ and each $E_2$ are independently moieties with the general structure of $R'-(OCO_2-)_i$, where each R' is independently an aliphatic or aromatic moiety that is optionally halogenated, and i is an integer from 2 to 6, n, m and L are integers, at least one of L and m is greater than zero, g and h are integers from 0 to 10, and k is a positive integer. A is represented by the general formula $CY_2=C(X)-CO_2-$, where Y is H or D, X is H, D, F, Cl or $CH_3$, each W is independently represented by one of the general formula:

where r is an integer greater than or equal to 2, each $R_f$ is independently represented by one of the formulae $-CH_2(CF_2)_tCH_2-$, $-CH_2CF_2O-[(CF_2CF_2O)_p-(CF_2O)_q]-CF_2CH_2-$, $-CH_2CH_2OCH_2CF_2O-[(CF_2CF_2O)_p-(CF_2O)_q]-CF_2CH_2OCH_2CH_2-$, or $-CH_2CF(CF_3)O(CF_2)_4O[CF(CF_3)CF_2O]_pCF(CF_3)CH_2-$, where p, q and t are integers and q can optionally be zero.

Polycarbonates of these types could be derived by reacting aliphatic or aromatic chloroformates with the fluorinated alkyl or fluorinated ether diols mentioned previously and then forming the acrylate. Examples of these chloroformates would include phenylene bischloroformate, bisphenol A bischloroformate, hexafluoro bisphenol A bischloroformate, hexanebischloroformate, tripropylene glycol bischloroformate, chlorendic bischloroformate, and trimethylolpropane trichloroformate.

Polycarbonates of this type could also be derived by reacting the fluorinated alkyl diols or fluorinated ether diols with phosgene to generate the corresponding chloroformate. These chloroformates could then be reacted with aliphatic or aromatic polyols to generate a polycarbonate, which could then be acrylated. Suitable chloroformates formed in this manner could include octafluorohexanebischloroformate, dodecafluorooctanebischloroformate, hexadecafluorodecanebischloroformate, and bischloroformates, made from FLUOROLINK® D, FLUOROLINK® D1000 and FLUOROLINK® E from Ausimont, and bischloroformates made from fluorinated triethylene glycol and fluorinated tetraethylene glycol from Exfluor.

Suitable aliphatic or aromatic polyols could include ethylene glycol, propylene glycol, butanediol, pentanediol, hexanediol, heptanediol, octanediol, catechol, hydroquinone, and tetrafluorohydroquinone, glycerine, butanetriol, sucrose, pentaerythritol, pyrogallol, and phloroglucinol, chlorendic diol.

The polymerizable fluorinated compounds of this invention (i.e., the fluorinated polyester acrylates and acrylate derivates of carbonates) typically have a molecular weight of from about 1000 to about 10,000, and preferably from about 2,000 to 6,000. Such compounds may be regarded as macromers or macromolecular monomers. The macromers of this invention have much higher viscosity than the monomers employed in conventional compositions used for preparing polymeric optical components. Typically, the macromers of this invention have a viscosity (as determined at 25° C. using a Gilmont falling ball viscometer in accordance with ASTM 1343-93) of at least 100 centipoise up to several thousand centipoise (e.g., 5,000 centipoise).

The fluorinated acrylate monomers of this invention are useful for preparing polymerizable compositions, such as polymerizable compositions that polymerize upon exposure to ultraviolet radiation. Such compositions may be prepared by combining the monomers of this invention with a suitable photoinitiator. The photoinitiator may be used in a conventional amount, with a typical amount being from about 0.5% by weight to about 5% by weight of the composition. Preferably, the polymerizable compositions are free of solvents, (i.e., the composition consists essentially of polymerizable compounds (monomers) and the photoinitiator). In order to achieve the beneficial effects of higher viscosity, increased refractive index, and reduced volatility, the composition should contain at least 1% of the fluorinated monomers of this invention by weight, more preferably, at least 5% or 10%, and even more preferably at least about 20%. Up to 100% of the monomers in the composition may be fluorinated polyester acrylates and/or fluorinated acrylate derivates of carbonates in accordance with the invention. However, the polymerizable compositions of this invention may also contain conventional lower molecular weight monomers (including monofunctional and polyfunctional monomers).

The compositions of this invention are useful for fabricating planar waveguide devices. An example of a planar waveguide device is shown schematically in FIG. 1. The device 10 includes a substrate 12, which may, for example, be a silicon wafer, an undercladding layer 14, a core layer 16 and an overcladding layer 18. Core layer 16 is typically a patterned layer that defines a waveguide circuit. Cladding layers 14 and 18 typically surround core layer 16 and have a refractive index that is lower than the refractive index of core layer 16. The polymerizable compositions of this invention that contain the fluorinated polyester acrylates and/or fluorinated acrylate derivatives of carbonates may be used for forming any or all of layers 14, 16 and 18. It is also possible to form other waveguiding structures from the materials of this invention, as for example, raised-rib, strip-loaded, and slab waveguides. As is well known in the art, a desired refractive index can be achieved by selecting monomers having an appropriate level of fluorination or other functionality. For example, higher levels of fluorination result in lower refractive index, whereas monomers having chlorine-containing moieties, bromine-containing moieties or phenyl-containing moieties have higher refractive index. Different monomers can be blended to provide generally any desired refractive index.

Figure 1:
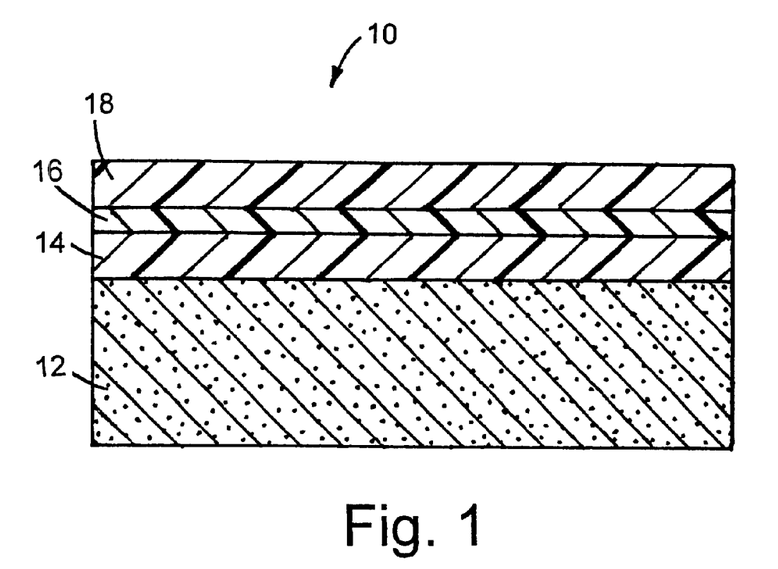
FIG. 1 is a schematic cross section of one example of a planar waveguide device of the invention.

An undercladding layer 14 can be formed from the compositions of this invention by spin-coating such composition onto substrate; 12, and thereafter polymerizing the composition, such as by exposing the composition to ultraviolet radiation. A layer 16 using a composition in accordance with the invention may be prepared by spin-coating a composition, which polymerizes to form a transparent material having a slightly higher refractive index. After layer 16 has been applied by, for example, spin coating, layer 16 may be patterned using any of several photolithography and etching techniques. Such photolithography techniques include contact, projection, and proximity lithography. Such etching techniques include solvent or wet chemical etching, reactive ion etching (RIE), electron beam, and ion milling. Thereafter, a composition similar to that used to form undercladding layer 14 may be deposited over the patterned core layer 16 and polymerized to form overcladding layer 18.

EXAMPLES

The following examples illustrate particular embodiments of the invention, but do not limit the scope of the invention.
Measurements Each of the materials listed below was tested after synthesis to determine its suitability for use in making waveguides using the following criteria.
Absorbance These materials need to be able to be relatively transparent to light at 1550 nanometers. To determine this property, the liquid material was placed in a 1 centimeter quartz cuvette. A Cary 5 spectrophotometer was set to zero absorbance in air at 1550 nanometers. The sample was then inserted into the spectrophotometer and the absorbance was measured at this wavelength. It is preferable that the sample in the cuvette has an absorbance of less than 0.080. It is more preferable that it has an absorbance of less than 0.060. It is most preferable that it has an absorbance of less than 0.050.

Conversion of absorbance measurements at 1550 nanometers to loss measurements is possible by correcting for Fresnel reflections using the refractive index of the liquid at 1550 nanometers. The following table shows the baseline absorbance predicted by Fresnel reflections at a given refractive index.

| Refractive Index Range | Baseline Absorbance |
| --- | --- |
| 1.31–1.33 | 0.031 |
| 1.34–1.38 | 0.030 |
| 1.39–1.50 | 0.029 |
| 1.51–1.56 | 0.030 |
| 1.57–1.60 | 0.031 |

Conversion to loss measurements can then be accomplished with the following equation:

$$\text{Loss in dB/cm} = 10 \cdot (\text{Measured Absorbance} - \text{Baseline Absorbance})$$

Since the liquid loss measurements for these types of materials correspond well to their waveguide losses, the waveguide loss can easily be estimated. Using an average baseline absorbance value of 0.030, it is preferable that the loss of these materials as calculated above is less than 0.50 dB/cm. It is more preferable that the loss is less than 0.30 dB/cm. It is most preferable that the loss is less than 0.20 dB/cm. For demanding applications where long lengths are required, it is most preferable for the loss to be less than 0.15 dB/cm.

Density

Density was determined using a midget weight-per-gallon cup from BYK-Gardener USA in accordance with the manufacturer's instructions. The value obtained in pounds per gallon was then converted to grams per cubic centimeter.

Viscosity

The viscosity of the monomers was measured at 25° C. using a Gilmont falling ball viscometer in accordance with ASTM 1343-93. The density measured as described above was used to convert the reading from centistrokes to centipoise. Typically, higher viscosity monomers have improved spin-coating characteristics.

Refractive Index

The sample was mixed with 2% fluorinated photoinitiator (see below) and filtered using a 0.1 micron filter. About 1 ml of sample was then placed on top of a silicon wafer resting on a chuck for a spin coater. The sample was then spun at a speed sufficient to obtain a layer between 5 and 7 micron thick of the uncured material on top of the silicon wafer. The assembly was then placed in a nitrogen purge box. The sample was purged with a heavy flow of nitrogen for two minutes. The sample was then cured with 10 milwatts/cm$^2$ of UV light from an Oriel model 81173 UV exposure unit for 180 seconds. The high dosage was used to insure that the reaction was fully completed. The refractive index of the fully cured film was then measured using a Metricon 2010 prism-coupling device in accordance with the manufacturer's instructions. All measurements were made using a 1550 nanometer laser.

Film Uniformity

The sample prepared during the refractive index measurement was then visually examined by placing it at an angle to a monochrome light source. The sample was judged subjectively on its coating uniformity and the number of defects (pinholes, orange peel, gel particles, etc.).

Fluorinated Photoinitiator

Since most conventional photoinitiators are not soluble in highly fluorinated materials, it is necessary to use a photoinitiator that contains a flurorinated moiety.

Examples of fluorinated photoinitiators can be found in U.S. Pat. Nos. 5,391,587 and RE 35,060. In accordance with U.S. Pat. No. 5,391,587, a fluorinated photoinitiator was made with the following structure:

To make this material, 23.8 grams (0.1 moles) of Irgacure 2959 (Ciba Additives) was added to a three neck flask equipped with a condenser and a mechanical stirrer. 50 grams (0.12 moles) of perfluorooctanoic acid chloride (Lancaster Synthesis) were then added and the mixture was stirred and heated to 70° C. for two hours. The IR spectrum, was then checked every hour until it showed a constant ratio of net absorbance between the OH peak at 3450 cm$^{-1}$ and the carboxyl peak at 1780 cm$^{-1}$. The sample was then rotovaped at 85° C. to remove excess perfluorooctanoic acid chloride. The final product was a waxy solid with a melt point of about 40° C.

Comparative Example A

A three-neck flask was fitted with a condenser and a mechanical stirring rod. 500 grams (0.5 moles) of FLUOROLINK® D 1000 (Ausimont USA) was added to the flask along with 100 grams (1.1 moles) of acryloyl chloride and 0.5 grams of butylated hydroxy toluene (BHT). The mixture was stirred vigorously and allowed to exotherm to 70° C. After 4 hours, the excess acryloyl chloride was stripped off in a rotovap under vacuum and returned to a clean three-neck flask. 82 grams (0.81 moles) of triethyl amine were slowly added while cooling with ice water. A white precipitate rapidly formed. The reaction was allowed to continue overnight. The next day, the material was washed three times with an equal volume of water. The resultant material was a low viscosity liquid with a slightly yellow color. Test results are shown below:

| Absorbance | 0.049 |
| Density | 1.66 |
| Viscosity | 16 cps |
| Refractive Index | 1.339 |
| Film Uniformity | Poor - - many defects |

While the loss value for this material, as indicated by the low absorbance measurement, was very good, its coating properties were very poor. With a viscosity of only 16 centipoise, the material tended to dewet the surface of the silicon wafer. Consequently, coating non-uniformities was abundant. For this reason, this material was unsuitable by itself for use in making waveguides.

Comparative Example B

A three-neck flask was fitted with a condenser and mechanical stirring rod. 1000 grams (0.5 moles) of FLUOROLINK® D (2000 molecular weight, Ausimont USA) was added to the flask along with 100 grams (1.1 moles of acryloyl chloride and 1.0 grams of butylated hydroxy toluene (BHT). The mixture was stirred vigorously and allowed to exotherm to 70° C. After 4 hours, the excess acryloyl chloride was stripped off in a rotovap under vacuum and returned to a clean three-neck flask. 82 grams (0.81 moles) of triethyl amine were slowly added while cooling with ice water. A white precipitate rapidly formed. The reaction was allowed to continue overnight. The next day, the material was washed three times with an equal volume of methanol. The resultant material was a low viscosity liquid with a slightly yellow color. Test results are shown below:

| Absorbance | 0.042 |
| Density | 1.75 |
| Viscosity | 43 cps |

| | |
|---|---|
| Refractive Index | 1.3079 |
| Film Uniformity | Fair - - some, defects |

While the loss value for this material, as indicated by the low absorbance measurement, was very good, its coating properties were also poor. With a viscosity of only 43 centipoise, the material still tended to dewet the surface of the silicon wafer. Consequently, coating non-uniformities were abundant. For this reason, this material was unsuitable by itself for use in making waveguides.

Example #1

Where RF is $CF_2O(CF_2CF_2O)_m(CF_2O)_nCF_2$ with a molecular weight of 1000. This material was made as follows: A three-neck flask was fitted with a condenser and a mechanical stirring rod. 125 grams (0.125 moles) of FLUOROLINK® D1000 was added to the flask along with 12.8 grams (0.063 moles) of isophthaloyl dichloride (Aldrich) and 0.15 grams of butylated hydroxy toluene (BHT). The mixture was heated to 50° C. until all ingredients were dissolved. 29 grams (0.29 moles) of triethyl amine were then added dropwise while maintaining a temperature of between 50° and 70° C. using an ice bath. A white precipitate quickly formed. 13.4 grams of acryloyl chloride (0.15 moles) were added dropwise while still maintaining a temperature of between 50° and 70° C. using an ice bath. After 2 hours, the material was washed three times with an equal volume of methanol and then rotovaped at 70° C. for one hour under vacuum. Test results are shown below:

| | |
|---|---|
| Absorbance | 0.056 |
| Density | 1.70 |
| Viscosity | 409 cps, |
| Refractive Index | 1.3393 |
| Film Uniformity | Good - - no defects |

Example #2

Where RF is $CF_2O(CF_2CF_2O)_m(CF_2O)_nCF_2$ with a molecular weight of 1000. This material as made as follows: A three-neck flask was fitted with a condenser and a mechanical stirring rod. 100 grams (0.1 moles) of FLUOROLINK® D1000 was added to the flask along with 6.8 grams (0.0256 moles) of 1,3,5-Benzenetricarbonyl trichloride (Aldrich) and 0.1 grams of butylated hyroxy toulene (BHT). The mixture was heated to 70° C. until all ingredients were dissolved. The IR spectrum was then checked every hour until it showed a constant ratio of net absorbance between the OH peak at about 3500 cm$^{-1}$ and the carbonyl peak at about 1750 cm$^{-1}$. 22 grams (0.158 moles) of triethyl amine were then added dropwise while maintaining a temperature of between 50° and 70° C. using an ice bath. A white precipitate quickly formed 13 grams of acryloyl chloride (0. 144 moles) were added dropwise while still maintaining a temperature of between 50° and 70° C. using an ice bath. After 2 hours, the material was washed three times with an equal volume of methanol and then rotovaped at 70° C. for one hour under vacuum.

In this reaction, an excess of FLUOROLINK® D1000 was used to prevent excessive chain extension. The final product can be considered to be 3 parts of the structure drawn above along with 1 part of the material from comparative example A. Test results are shown below:

| | |
|---|---|
| Absorbance | 0.054 |
| Density | 1.70 |
| Viscosity | 136 cps |
| Refractive Index | 1.3336 |
| Film Uniformity | Good - - no defects |

Example #3

Were RF is $CF_2O(CF_2CF_2O)_m(CF_2O)_nCF_2$ with a molecular weight of 1000. This material was made as follows: A three-neck flask was fitted with a condenser and a mechanical stirring rod. 75.8 grams (0.0379 moles) of FLUOROLINK® D1000 was added to the flask along with 15.4 grams (0.0758: moles) of isophthaloyl dichloride (Aldrich), 8.8 grams (0.0758) of hydroxyethyl acrylate (Aldrich), and 0.1 grams of butylated hydroxy toluene (BHT). Also added were 50 ml of HFE-7200, a fluorinated solvent made by 3M. The mixture was heated to 70° C. for one hour. 16 grams (0.16 moles) of triethyl amine were then added dropwise while maintaining a temperature of between 50° and 70° C. using an ice bath. A white precipitate quickly formed. After 2 hours, the material was washed three times with an equal volume of methanol and then rotovaped at 70° C. for one hour under vacuum. Test results are shown below:

| | |
|---|---|
| Absorbance | 0.040 |
| Density | 1.75 |
| Viscosity | 4237 cps |
| Refractive Index | 1.3289 |
| Film Uniformity | Excellent - no defects |

It will become apparent to those skilled in the art that various modifications to the preferred embodiment of the invention as described herein can be made without departing from the spirit or scope of the invention as defined by the appended claims.

Where RF is $CF_2O(CF_2CF_2O)_m(CF_2O)_nCF_2$ with a molecular weight of 2000. This material was made as follows: A three-neck flask was fitted with a condenser and a mechanical stirring rod. 100 grams (0.05 moles) of FLUOROLINK® D2000 was added to the flask along with 23.2 grams (0.20 moles) of hydroxyethyl acrylate (Aldrich), 27.5 grams (0.10 moles) of 1,3,5-benzenetricarboxylic acid chloride (Acros) and 0.10 grams of butylated hydroxytoluene (BHT). The mixture was heated to 70° C. for 3 hours. 130 ml of HFE-7200, a partially fluorinated solvent made by 3M was added. 30 grams (0.30 moles) of triethyl amine were then added dropwise while maintaining a temperature of between 50° and 70° C. using an ice bath. A white precipitate quickly formed. After 3 hours, the material was washed three times with an equal volume of methanol and then filtered at 0.2 micron. Filtered material was rotovaped at 70° C. for two hours under vacuum. Test results are shown below:

| | |
|---|---|
| Absorbance | 0.047 |
| Density | 1.70 |
| Viscosity | >5000 cps |
| Refractive Index | 1.3474 |
| Film Uniformity | Good - no defects |

Example #4

Example #5

Where RF is $CF_2O(CF_2CF_2O)_m(CF_2O)_nCF_2$ with a molecular weight of 1000. This material as made as follows: A three-neck flask was fitted with a condenser and a mechanical stirring rod. 40 grams (0.04 moles) of FLUOROLINK® D1000 was added to the flask along with 10.0 grams (0.023 moles) of 1,4,5,6,7,7-hexachloro-5-norbornene-2,3-dicarboxylic acid chloride and 0.05 grams of butylated hydroxytoluene (BHT). The mixture was heated to 70° C. until all ingredients were dissolved. 12 ml (0.086 moles) of triethyl amine were then added dropwise while maintaining a temperature of between 50° and 70° C. using an ice bath. After reacted for 1 hour, 6.5 grams of acryloyl chloride (0.07 moles) were added dropwise while still maintaining a temperature of between 50° and 70° C. using an ice bath. After 3 hours, 80 ml of HFE-7200 was added. The mixture was washed three times with an equal volume of methanol-water (1:5 by volume). Material was filtered at 0.2 micron and then rotovaped at 70° C. for one hour under vacuum. Test results are shown below:

| | |
|---|---|
| Absorbance | 0.052 |
| Density | 1.65 |
| Viscosity | 285 cps |
| Refractive Index | 1.3374 |
| Film Uniformity | Good - - no defects |

The invention claimed is:

1. A planar waveguide device, comprising:

an undercladding layer;

a patterned core layer; and an overcladding layer, the undercladding layer and overcladding layer having refractive indicies less than that of the patterned core layer, the undercladding layer and overcladding layer surrounding the patterned core layer;

at least one of the undercladding layer, patterned core layer, and overcladding layer being a polymer or copolymer of a polymerizable compound including at least one fluorinated alkylene or fluorinated alkylene ether moiety, at least two terminal acrylate moieties, each terminal acrylate moiety being connected to one fluorinated alkylene or fluorinated alkylene ether moiety by an ester linking group, and at least two additional ester linkages.

2. The planar optical device of claim 1, wherein the polymerizable compound is represented by the general formula:

where each $B_d$ is independently a moiety with the general structure $R$—$(CO_2$—$)_2$, each R is an aromatic or aliphatic group that is optionally halogenated, $B_1$ and each $B_2$ are independently moieties with the general structure of $R'$—$(CO_2$—$)_i$, where each i is independently an integer from 2 to 6, each $R'$ is independently an aromatic or aliphatic moiety that is optionally halogenated, n, m and L are integers, at least one of L and m is greater than zero, each g and h is independently an integer from 0 to 10, each A is independently represented by the formula $CY_2$=$C(X)$—$CO_2$—, where Y is H or D, X is H, D, F, Cl or $CH_3$, each W is independently represented by one of the formulae:

where r is an integer greater than or equal to 2, $R_f$ is represented by one of the formulae: —$CH_2(CF_2)_tCH_2$—, —$CH_2CF_2O$—$[(CF_2CF_2O)_p$—$(CF_2O)_q]$—$CF_2CH_2$—, —$CH_2CH_2OCH_2CF_2O$—$[(CF_2CF_2O)_p$—$(CF_2O)_q]$—$CF_2CH_2OCH_2CH_2$—, or —$CH_2CF$ $(CF_3)O(CF_2)_4O[CF(CF_3)CF_2O]_pCF(CF_3)CH_2$—, where k, p, q and t are integers and q can optionally equal zero.

3. The planar optical device of claim 1, wherein the polymerizable compound is represented by the general formula:

where each $D_d$ is independently a moiety with the general structure $R$—$(CH_2$—$)_2$, where each R is independently an aliphatic or aromatic moiety that is optionally halogenated, $D_1$ and each $D_2$ are independently moieties with the general structure $R'$—$(CH_2$—$)_i$, where each $R'$ is independently an aliphatic or aromatic moiety that is optionally halogenated, and i is an integer from 2 to 6, A is represented by the formula $CY_2$=$C(X)$—$C(O)$—, where Y is H or D, X is H, D, F, Cl or $CH_3$, each $R_f$ is independently represented by one of the formulae: —$(O)C$—$(CF_2)_n$—$C(O)$—, —$(O)C$—$CF_2$—$[(CF_2CF_2O)_p$—$(CF_2O)_q]$—$CF_2$—$C(O)$—, or —$(O)C$—$CF$ $(CF_3)O(CF_2)_4O[CF(CF_3)CF_2O]_pCF(CF_3)$—$C(O)$—, where g, n, p, q, r, u and t are integers, with at least one of r and t being a positive integer and q can optionally equal zero.

4. The planar optical device of claim 1, wherein the polymerizable compound is represented by the general formula:

where each $E_d$ is independently a moiety with the general structure $R$—$(OCO_2$—$)_2$, where each R is independently an aliphatic or aromatic moiety that is optionally halogenated, $E_1$ and each $E_2$ are independently moieties with the general structure $R'$—$(OCO_2$—$)_i$, where each $R'$ is independently an aliphatic or aromatic moiety this is optionally halogenated and i is an integer from 2 to 6, n, m and L are integers, at least one of L or m is a positive integer; g and h are integers from 0 to 10, k is a positive integer, A is represented by the formula $CY_2=C(X)—CO_2—$, where Y is H or D, X is H, D, F, Cl or $CH_3$, each W is represented by one of the formulae:

where r is an integer greater than or equal to 2, each $R_f$ is represented by one of the formulae: $—CH_2(CF_2)_tCH_2—$, $—CH_2(CF_2O—(CF_2CF_2O)_p—(CF_2O)_q]—CF_2CH_2—$, $—CH_2CH_2OCH_2CF_2O—[(CF_2CF_2O)_p—(CF_2O)_q]—CF_2CH_2OCH_2CH_2—$, $—CH_2CF(CF_3)O(CF_2)_4O[CF(CF_3)CF_2O]_pCF(CF_3)CH_2—$, where p, q, and t are integers and q can optionally equal zero.

5. The planar optical device of claim 1, wherein the photoinitiator is present in an amount of from about 0.5% to about 5%, and the polymerizable compound is present in an amount of from about 1% to about 99.5%.

6. The planar optical device of claim 1, wherein the polymerizable compound is present in an amount of at least 5%.

7. The planar optical device of claim 1, wherein the polymerizable compound is present in an amount of at least 10%.

8. The planar optical device of claim 1, wherein the polymerizable compound is present in an amount of at least 20%.

9. The planar optical device of claim 1, wherein the composition has a viscosity of at least 100 centipoise at 25° C.

10. The planar optical device of claim 1, wherein the polymerizable compound has a molecular weight of from about 1,000 to about 10,000.

11. The planar optical device of claim 1, wherein the polymerizable compound has a molecular weight of from about 2,000 to about 6,000.

* * * * *